United States Patent
Yokoyama et al.

(10) Patent No.: US 11,392,203 B2
(45) Date of Patent: Jul. 19, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Ryo Yokoyama, Tokyo (JP); Osamu Ito, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/981,082

(22) PCT Filed: Jan. 18, 2019

(86) PCT No.: PCT/JP2019/001481
§ 371 (c)(1),
(2) Date: Sep. 15, 2020

(87) PCT Pub. No.: WO2019/187527
PCT Pub. Date: Oct. 3, 2019

(65) Prior Publication Data
US 2021/0004088 A1    Jan. 7, 2021

(30) Foreign Application Priority Data
Mar. 27, 2018   (JP) .............................. JP2018-059309

(51) Int. Cl.
*G06F 3/01*   (2006.01)
(52) U.S. Cl.
CPC .............. *G06F 3/016* (2013.01); *G06F 3/011* (2013.01)

(58) Field of Classification Search
CPC ........... G05B 2219/40553; G06F 3/016; G06F 3/04886; B60W 50/16; F15B 13/14; H01H 13/85
See application file for complete search history.

(56) References Cited

U.S. PATENT DOCUMENTS

| | | | |
|---|---|---|---|
| 9,753,539 B2 * | 9/2017 | Hwang | G06F 3/016 |
| 10,055,948 B2 * | 8/2018 | Kim | A61B 5/0816 |
| 10,243,597 B2 * | 3/2019 | Leclerc | H04W 4/80 |
| 10,251,017 B2 * | 4/2019 | Leclerc | H04W 76/11 |
| 11,079,249 B1 * | 8/2021 | Zimon | G06F 3/014 |
| 2003/0040361 A1 * | 2/2003 | Thorner | A63F 13/24 463/36 |
| 2009/0153350 A1 * | 6/2009 | Steger | G04F 5/025 340/4.2 |
| 2011/0248837 A1 * | 10/2011 | Israr | G06F 3/016 340/407.1 |
| 2011/0300943 A1 * | 12/2011 | Devine | H04L 61/2092 463/42 |

(Continued)

*Primary Examiner* — William Lu
(74) *Attorney, Agent, or Firm* — Paratus Law Group, PLLC

(57) ABSTRACT

There is provided an information processing apparatus that makes it possible to apply a tactile stimulus in a more flexible manner in accordance with the position of a tactile-sense applying unit. The information processing apparatus includes: an acquiring unit that acquires the positional information on at least one of a plurality of tactile-sense applying units that apply a tactile stimulus by using a tactile control signal generated for each of the tactile-sense applying units; and a data processing unit that changes the tactile control signal by using the positional information.

12 Claims, 12 Drawing Sheets

(56) References Cited

U.S. PATENT DOCUMENTS

| | | | | |
|---|---|---|---|---|
| 2012/0119920 | A1* | 5/2012 | Sallop | A61H 3/061 340/686.6 |
| 2013/0089027 | A1* | 4/2013 | Son | H04W 4/00 370/328 |
| 2014/0114445 | A1* | 4/2014 | Gaudina | G06F 3/016 700/83 |
| 2015/0054727 | A1* | 2/2015 | Saboune | G06F 3/016 345/156 |
| 2015/0105129 | A1* | 4/2015 | Chapman | A63F 13/212 463/7 |
| 2015/0145656 | A1* | 5/2015 | Levesque | G06Q 20/321 340/407.1 |
| 2015/0324646 | A1* | 11/2015 | Kimia | G01C 21/206 348/62 |
| 2016/0012688 | A1* | 1/2016 | Eagleman | A61F 11/04 340/407.1 |
| 2016/0027338 | A1* | 1/2016 | Ebeling | G09B 19/00 340/4.12 |
| 2016/0258758 | A1* | 9/2016 | Houston | G01C 21/20 |
| 2017/0055596 | A1* | 3/2017 | Colby | A41D 1/002 |
| 2017/0108892 | A1* | 4/2017 | Lenzi | G06F 1/163 |
| 2017/0135609 | A1* | 5/2017 | Eckblad | A63B 69/32 |
| 2017/0232338 | A1* | 8/2017 | Goslin | A63F 13/327 463/31 |
| 2017/0252643 | A1* | 9/2017 | Chen | A63F 13/98 |
| 2018/0106636 | A1* | 4/2018 | Hu | A61H 3/061 |
| 2019/0087002 | A1* | 3/2019 | Mani | G09B 21/00 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/001481 (filed on Jan. 18, 2019) under 35 U.S.C. § 371, which claims priority to Japanese Patent Application No. 2018-059309 (filed on Mar. 27, 2018), which are all hereby incorporated by reference in their entirety.

FIELD

The present disclosure relates to an information processing apparatus, an information processing method, and a program.

BACKGROUND

Various techniques for applying a tactile stimulus such as a vibration to a user are conventionally disclosed as in, for example, Patent Literature 1 below.

CITATION LIST

Patent Literature

Patent Literature 1: JP 2016-38815 A

SUMMARY

Technical Problem

In some cases, however, the position of an actuator (also referred to as "tactile-sense applying unit") that applies a tactile stimulus is different at the time of recording (at the time of preparation, at the time of generation) and at the time of reproduction of a tactile control signal for controlling the apparatus disclosed in Patent Literature 1. Although the position of a tactile-sense applying unit is sometimes different at the time of recording and at the time of reproduction of a tactile control signal due to, for example, a change in the installation layout of tactile-sense applying units or the attachment state of the apparatus (e.g., attachment misalignment), it is difficult to be flexible in accordance with the positions of the tactile-sense applying units according to the technology of Patent Literature 1, etc.

Thus, the present disclosure discloses an information processing apparatus, an information processing method, and a program with which it is possible to apply a tactile stimulus in a more flexible manner in accordance with the position of a tactile-sense applying unit.

Solution to Problem

According to the present disclosure, an information processing apparatus is provided that includes: an acquiring unit that acquires positional information on at least one of a plurality of tactile-sense applying units that apply a tactile stimulus by using a tactile control signal generated for each of the tactile-sense applying units; and a data processing unit that changes the tactile control signal by using the positional information.

Moreover, according to the present disclosure, an information processing method implemented by a computer is provided that includes: acquiring positional information on at least one of a plurality of tactile-sense applying units that apply a tactile stimulus by using a tactile control signal generated for each of the tactile-sense applying units; and changing the tactile control signal by using the positional information.

Moreover, according to the present disclosure, a program is provided that causes a computer to execute: acquiring positional information on at least one of a plurality of tactile-sense applying units that apply a tactile stimulus by using a tactile control signal generated for each of the tactile-sense applying units; and changing the tactile control signal by using the positional information.

Advantageous Effects of Invention

As described above, according to the present disclosure, it is possible to apply a tactile stimulus in a more flexible manner in accordance with the position of a tactile-sense applying unit.

Furthermore, the above-described advantageous effects are not necessarily for limitation, but any advantageous effect mentioned in this description or other advantageous effects that may be understood from this description may be produced together with the above-described advantageous effect or in place of the above-described advantageous effect.

DESCRIPTION OF EMBODIMENTS

Figure 1:
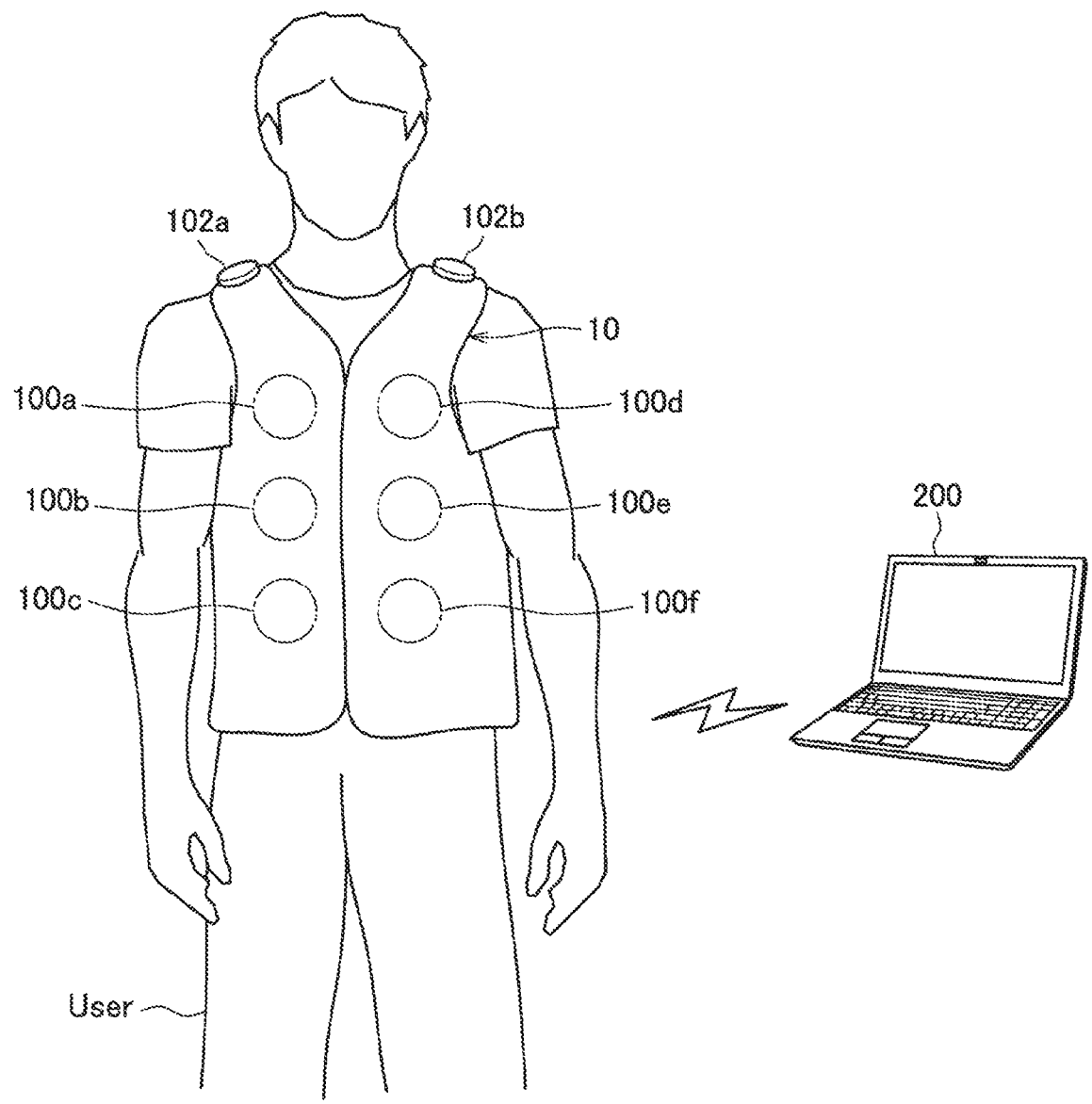
FIG. 1 is a diagram illustrating the overview of an information processing system according to an embodiment of the present disclosure.

A preferred embodiment of the present disclosure is described below in detail with reference to the accompanying drawings. Furthermore, in the description and the drawings, the constituent element including substantially the same functional component are denoted by the same reference numeral, and the duplicated descriptions are omitted.

Further, the description is given in the following order.
1. Overview of an information processing system according to an embodiment of the present disclosure
   1-1. Tactile-sense application module 100
   1-2. Background
2. Functional component
   2-1. Functional component of a server 200
   2-2. Functional component of the tactile-sense application module 100
3. Operation processing
   3-1. Operation to identify a position by the tactile-sense application module 100
   3-2. Operation to output a tactile control signal
4. Hardware Configuration
5. Conclusion Overview of the Information Processing System According to an Embodiment of the Present Disclosure FIG. 1 is a diagram illustrating the overview of the information processing system according to an embodiment of the present disclosure. As illustrated in FIG. 1, the information processing system according to the present embodiment includes: a tactile-sense application device 10 that applies a tactile stimulus to a user; and a server 200 that, for example, controls the content of the tactile stimulus.

Although the shape of the tactile-sense application device 10 is not particularly limited, the vest type worn by the user as illustrated in FIG. 1 is given as an example. The tactile-sense application device 10 illustrated in FIG. 1 includes the plurality of tactile-sense application modules 100 (a tactile-sense application module 100a to a tactile-sense application module 100f are illustrated in the drawing) and a plurality of sound output units 102 (a sound output unit 102a and a sound output unit 102b are illustrated in the drawing). For example, a predetermined number (e.g., six) of the tactile-sense application modules 100 may be disposed inside the tactile-sense application device 10 on each of the front side and the back side of the user. For example, each of the tactile-sense application modules 100 is arranged in such a positional relationship that the individual tactile-sense application modules 100 disposed on the front side are opposed to the individual tactile-sense application modules 100 disposed on the back side.

Furthermore, although FIG. 1 illustrates an example in which the tactile-sense application device 10 is a vest type (sleeveless clothes), this example is not a limitation, and the tactile-sense application device 10 may include sleeves. In this case, the one or more tactile-sense application modules 100 may be disposed on not only the chest and the abdomen of the user but also the positions corresponding to both arms of the user. Further, the tactile-sense application device 10 is not limited to the jacket illustrated in FIG. 1 but may be, for example, pants, sock, shoe, belt, hat, glove, or mask. Moreover, for example, the combination of things such as a jacket and pants may form the tactile-sense application device 10 (one group of the tactile-sense application devices 10). In other words, the tactile-sense application modules 100 are included in the single tactile-sense application device 10 (e.g., the vest-type tactile-sense application device 10 illustrated in FIG. 1) or one group of the tactile-sense application devices 10 (e.g., the jacket and the pants).

Furthermore, in the tactile-sense application device 10 illustrated in FIG. 1, the single sound output unit 102 is disposed on each of the right and left shoulder portions; however, the present embodiment is not limited thereto, and the single sound output unit 102 may be disposed or the three or more sound output units 102 may be disposed. Further, the sound output unit 102 may be disposed as an independent device in the predetermined space instead of being included in the tactile-sense application device 10 or may be included in a wearable device (e.g., headphones or a headset) or a portable device (e.g., a portable music player, a smartphone, or a portable game console) different from the tactile-sense application device 10.

Further, the tactile-sense application device 10 is not limited to the above-described clothing ornaments, but a controller, a gun-type controller, a bed, a chair, or the like, may be applied.

(1-1. The Tactile-Sense Application Module 100)

Figure 2:
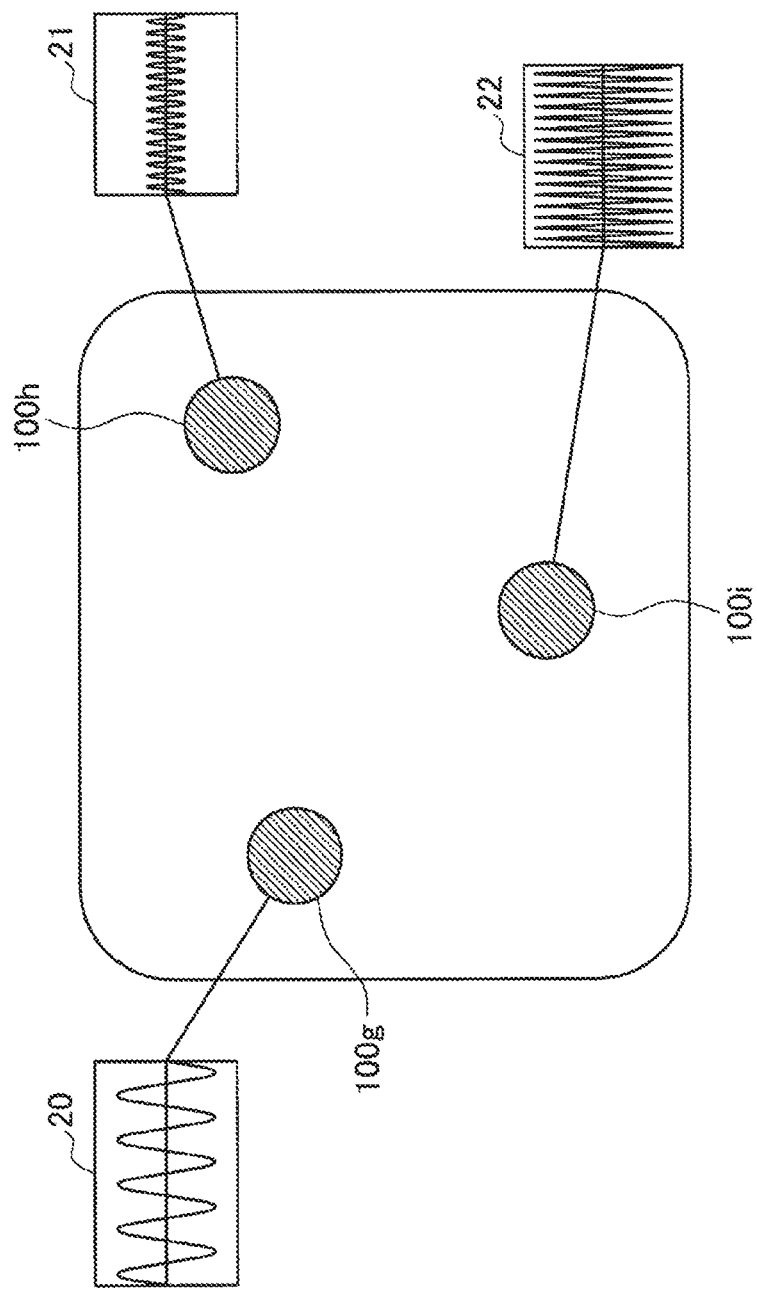
FIG. 2 is a diagram illustrating the overview of the information processing system according to an embodiment of the present disclosure.

The tactile-sense application modules 100 included in the tactile-sense application device 10 are information processing apparatuses capable of applying different tactile stimuli. For example, the tactile-sense application module 100 may generate vibrations by using a tactile control signal generated for each of the tactile-sense application modules 100 (e.g., a waveform 20 to a waveform 22 generated for a tactile-sense application module 100g to tactile-sense application module 100i, respectively, illustrated in FIG. 2).

When the tactile-sense application modules 100 individually generate vibrations, the generated vibrations may be perceived only in the neighborhood of the corresponding tactile-sense application module 100. That is, when the individual tactile-sense application modules 100 are located apart from each other, the vibrations separately generated by the individual tactile-sense application modules 100 may be perceived discretely in the user's body.

Furthermore, there is a medically defined illusion phenomenon called phantom sensation. Phantom sensation is an illusion phenomenon such that, when stimuli are simultaneously applied to different positions on the skin, a person perceives only one stimulus in the interval between the positions of the applied stimuli. For example, it is known that, when the two tactile-sense application modules 100 disposed on the user's body simultaneously output stimuli, the position (hereinafter referred to as "perceptual position" for convenience) of the stimulus perceived by the user is typically the position between the two tactile-sense application modules 100.

Furthermore, it is possible to continuously increase the range of tactile stimuli that may be applied by the tactile-sense application modules 100 by changing the output intensities of the tactile-sense application modules 100 without changing the installation intervals of the individual tactile-sense application modules 100. An example (an example of phantom sensation) of the relationship between the perceptual position and the output intensity of each of the two tactile-sense application modules 100 is described. It is assumed that, for example, the output intensity of the first tactile-sense application module 100 is continuously decreased, for example, "1", "0.6", and "0", and the output intensity of the second tactile-sense application module 100 is continuously increased, for example, "0", "0.6", and "1", as the time elapses. In this case, the perceptual position (perceived by the user) may continuously move from the application position of the first tactile-sense application module 100 to the application position of the second tactile-sense application module 100.

(1-2. Background)

Next, the background of the present disclosure is described. An apparatus that applies a tactile stimulus to a user, such as the apparatus disclosed in Patent Literature 1, is based on the assumption that the identical apparatus is used at the time of recording (preparation, generation) and at the time of reproduction of a tactile control signal, there is no change in the installation layout of tactile-sense applying units that apply tactile stimuli, or there is no change in the position of a tactile-sense applying unit with respect to a body (the apparatus is attached as appropriate or is used in an appropriate mode).

Therefore, the applied perceptual effect changes due to, for example, a change in the installation layout of the tactile-sense applying units at the time of recording and at the time of reproduction of a tactile control signal or due to a change in the position of the tactile-sense applying unit with respect to the body (the attachment state or the usage mode is different from the assumed one).

The discloser of the present disclosure has achieved the technique according to the present disclosure in consideration of the above-described circumstance. According to the present disclosure, the positional information on at least one of the tactile-sense applying units is acquired and a tactile control signal is changed by using the positional information so that a tactile stimulus may be applied in a more flexible manner in accordance with the position of the tactile-sense applying unit.

Figure 3:
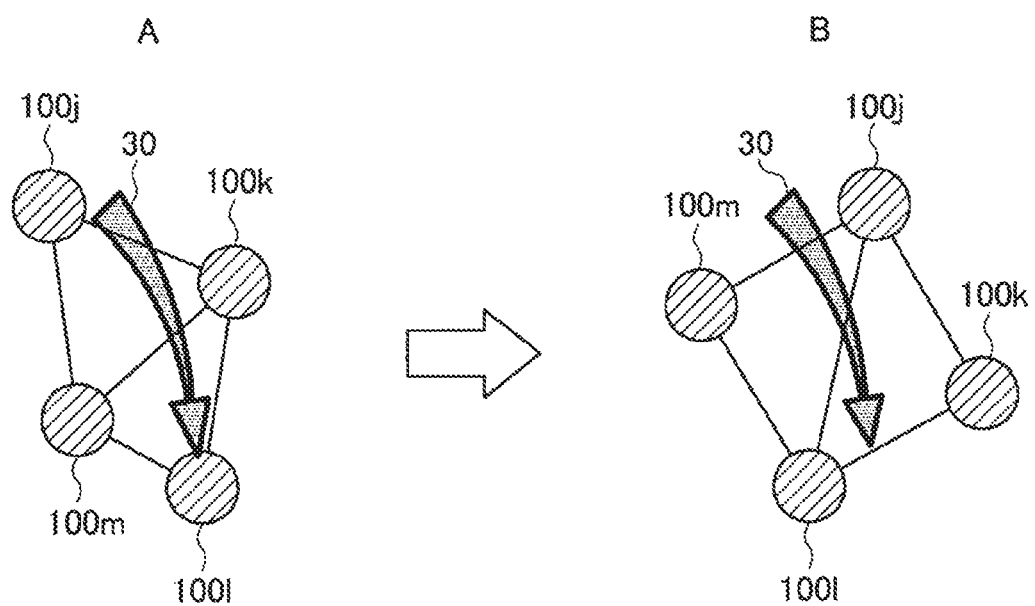
FIG. 3 is a diagram illustrating the overview of the information processing system according to an embodiment of the present disclosure.

More specific descriptions are given; it is assumed that, at the time of recording of a tactile control signal, a tactile-sense application module 100*j* to a tactile-sense application module 100*m*, which function as a tactile-sense applying unit, are arranged and designed such that a perceptual position 30 changes from the upper left to the lower right (for example, designed for the perception of cutting from the upper left to the lower right), as illustrated in A of FIG. 3.

Then, when the installation layout of each of the tactile-sense application modules 100 is changed or when the position of the tactile-sense application module 100 with respect to the body is changed (when the attachment state or the usage mode is different from the assumed one) after the recording of a tactile control signal, as illustrated in B of FIG. 3, the tactile-sense application module 100 according to the present disclosure may change the tactile control signal in accordance with the positional information. Thus, the present disclosure makes it possible to achieve the same perceptual effect as that at the time of the recording of the tactile control signal.

That is, it may be said that, according to the present disclosure, a tactile control signal used by the certain tactile-sense application device 10 (e.g., the tactile-sense application device 10 before the installation layout is changed or the tactile-sense application device 10 in a case where there is no change in the position) is changed so as to generate the tactile control signal used by the different tactile-sense application device 10 (e.g., the tactile-sense application device 10 after the installation layout is changed or the tactile-sense application device 10 in a case where there is a change in the position).

Figure 4:
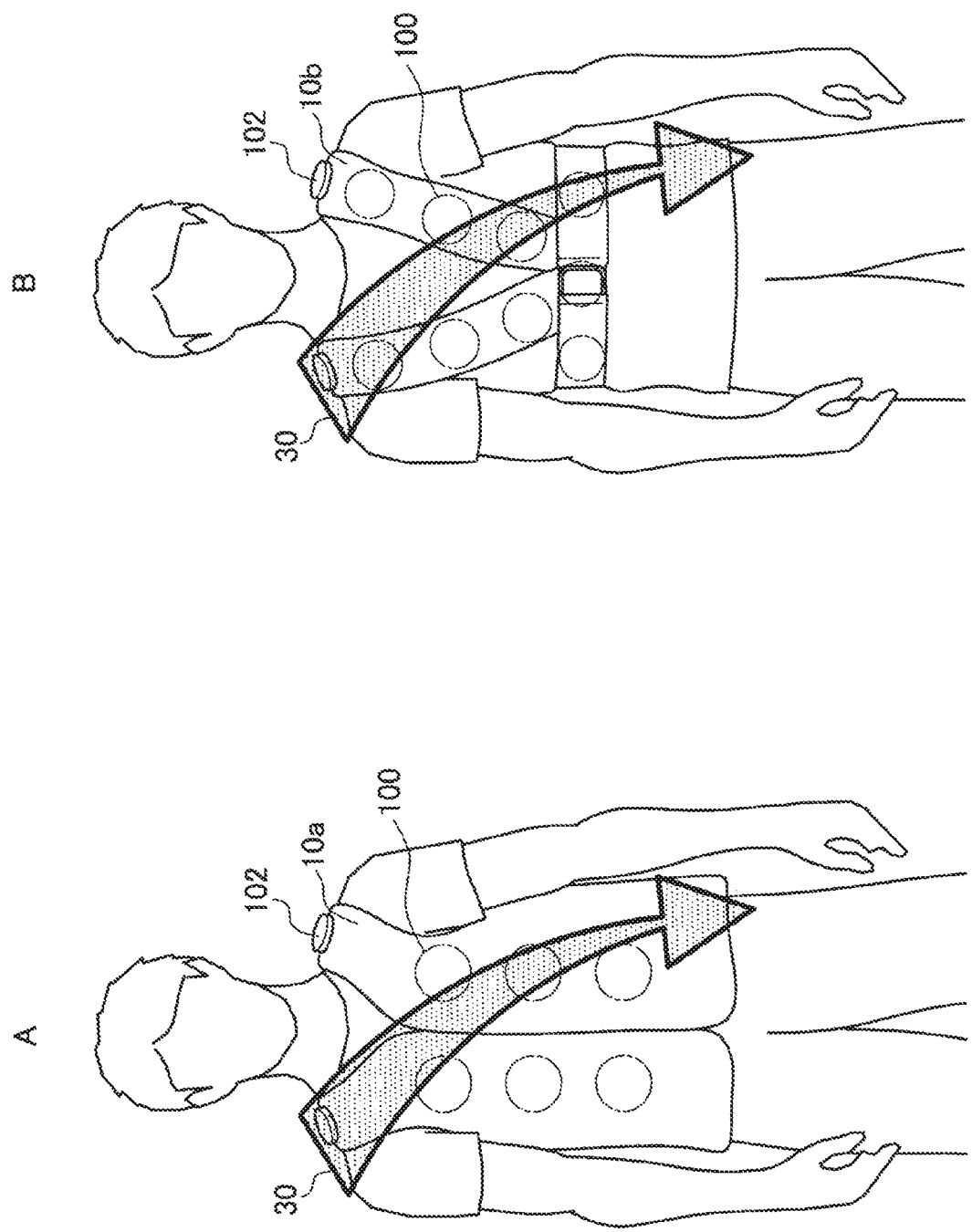
FIG. 4 is a diagram illustrating the overview of the information processing system according to an embodiment of the present disclosure.

Thus, according to the present disclosure, a tactile control signal recorded for a vest-type tactile-sense application device 10*a* illustrated in for example A of FIG. 4 may be changed to generate a tactile control signal that may be used for a life-jacket type tactile-sense application device 10*b* illustrated in B of FIG. 4. In other words, the present disclosure makes it possible to eliminate the load for recording a tactile control signal for each of the tactile-sense application devices 10 having a different installation layout of the tactile-sense application modules 100.

Furthermore, although the tactile-sense application module 100 applies a vibration in the above description, the tactile sense applied by the tactile-sense application module 100 is not limited to vibrations. For example, the tactile-sense application module 100 may apply any sense perceivable by a user, such as a sense of force (e.g., electrical stimulus) or a temperature sense.

2. Functional Component

In the above description, the overview of the information processing system according to the present embodiment has been described. Next, the functional component of the server 200 and the tactile-sense application module 100 according to the present embodiment is described in detail with reference to FIGS. 5 and 6.

(2-1. Functional Component of the Server 200)

Figure 5:
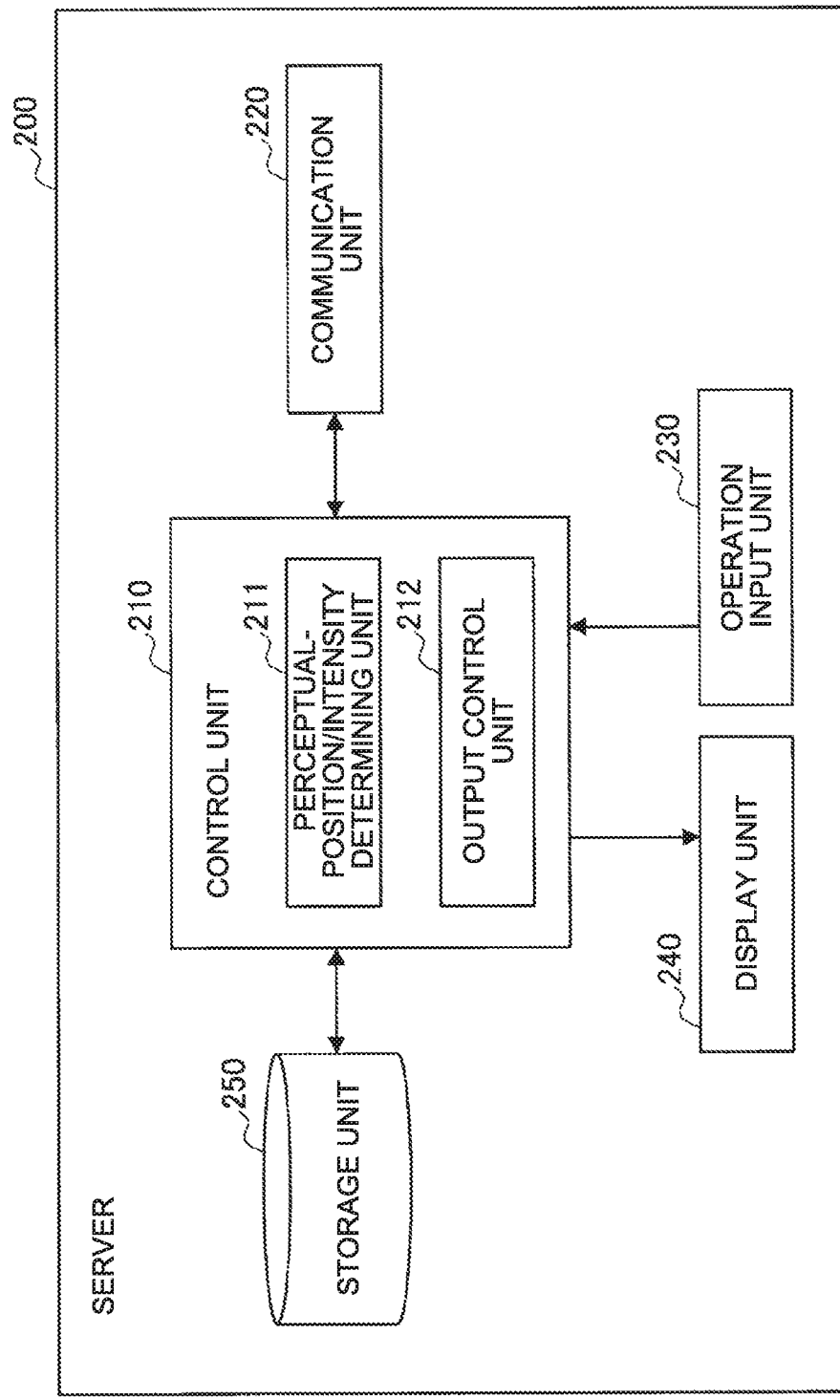
FIG. 5 is a block diagram illustrating an example of a functional component of a server 200.

First, with reference to FIG. 5, a functional component of the server 200 according to the present embodiment is described. FIG. 5 is a block diagram illustrating an example of a functional component of the server 200 according to the present embodiment.

As illustrated in FIG. 5, the server 200 is an information processing apparatus including a control unit 210, a communication unit 220, an operation input unit 230, a display unit 240, and a storage unit 250.

(The Control Unit 210)

The control unit 210 is a functional component that controls each functional component of the server 200 in an integrated manner. For example, the control unit 210 may control the activation or the termination of each functional component based on an input from the operation input unit 230 and may specify the perceptual position, the perceptual intensity, or the like, of the perception applied to the user by each of the tactile-sense application modules 100. Furthermore, the control details of the control unit 210 are not limited thereto. For example, the control unit 210 may perform processing (e.g., the processing of an operating system (OS)) that is generally performed in a general-purpose computer, a PC (personal computer), a tablet PC, a smartphone, or the like. Moreover, as illustrated in FIG. 5, the control unit 210 includes a perceptual-position/intensity determining unit 211 and an output control unit 212.

(The Perceptual-Position/Intensity Determining Unit 211)

The perceptual-position/intensity determining unit 211 is a functional component that, for example, determines (calculates) the content (e.g., the vibrational frequency or amplitude) of the perception for the tactile-sense application modules 100 corresponding to the target perceptual position (such that the specified perceptual intensity is perceived at the specified perceptual position) in accordance with the perceptual position or the perceptual intensity specified by the control unit 210 and generates the tactile control signal or the perceptual setting information to be output to the tactile-sense application modules 100.

Here, the tactile control signal according to the present disclosure is a signal used to apply a tactile sense by each of the tactile-sense application modules 100 (that is, it can be said that the tactile control signal is, but is not limited thereto, a signal generated for each of the tactile-sense application modules 100). For example, the tactile control signal may be the waveform information used to apply a vibration or a sense of force or may be the numerical information used to apply a temperature sense. Furthermore, the details of the tactile control signal are not limited to thereto. For example, the tactile control signal used to apply a vibration or a sense of force may be numerical information, or the tactile control signal used to apply a temperature sense may be waveform information.

Furthermore, the perceptual setting information according to the present disclosure is various types of setting information that is intended by the server 200 so as to be perceived by the user. For example, the perceptual setting information may be the information including the perceptual position, the perceptual intensity, or the like. According to the present disclosure, as the tactile-sense application module 100 is provided with the perceptual setting information together with the tactile control signal so that the tactile-sense application module 100 may change the tactile control signal as appropriate in accordance with the perceptual setting information and the positional information on the tactile-sense application module 100.

Here, the perceptual position in the perceptual setting information includes the movement route of the perceptual position. The perceptual position and the movement route of the perceptual position may be set on the surface of the user's body. For example, it is possible to apply a tactile stimulus to the user such that the perceptual position continuously moves from the position serving as the start point on the user's body to the position serving as an end point. Alternatively, the movement route of the perceptual position may be set as the route connecting a first surface of the user's body, the inside of the user's body, and a second surface opposed to the first surface. Here, the first surface may be the user's front side, and the second surface may be the user's back side. Alternatively, the first surface may be the front surface of a predetermined site such as an arm, and the second surface may be the back surface of the site. For example, when the movement route is the route connecting the position on the front side of the user, the inside of the user's body, and the position on the back side of the user, it is possible to apply, to the user, the sense penetrating the inside of the body from the front side to the back side.

Furthermore, the perceptual-position/intensity determining unit 211 may also set a perceptual range.

Further, the perceptual-position/intensity determining unit 211 may relate the perceptual position to the timing corresponding to the content being reproduced (e.g., a movie or a game content). Thus, with the use of the tactile-sense application device 10, it is possible to apply a predetermined tactile stimulus at a predetermined timing to the user who is viewing the content.

Moreover, the perceptual-position/intensity determining unit 211 may determine the content of the perception for all the tactile-sense application modules 100 included in the tactile-sense application device 10 or may determine the content of the perception for only some of the tactile-sense application modules 100 in accordance with the timing of the content, etc.

(The Output Control Unit 212)

The output control unit 212 is a functional component that controls the tactile-sense application module 100 so as to output a tactile stimulus in accordance with the details determined by the perceptual-position/intensity determining unit 211. Thus, for example, the user actually wears the tactile-sense application device 10 and has a physical feeling so as to check the effect (the perceptual effect) of the specified tactile stimulus. Specifically, the output control unit 212 outputs the tactile control signal and the perceptual setting information generated by the perceptual-position/intensity determining unit 211 to each of the tactile-sense application modules 100. Furthermore, the output control unit 212 may also control the reproduction of the content (video) that is reproduced by a display device (a display, an HMD, a projector, a PC, a smartphone, etc.) and control the tactile-sense application module 100 so as to output a tactile stimulus at the predetermined set timing in accordance with the reproduction of the content. Moreover, the output control unit 212 may also control the sound output unit 102 of the tactile-sense application device 10 so as to reproduce a sound, such as an impact sound, corresponding to the applied tactile stimulus.

(The Communication Unit 220)

The communication unit 220 is a functional component that transmits and receives information to and from a different device. For example, the communication unit 220 transmits the tactile control signal and the perceptual setting information to each of the tactile-sense application modules 100 under the control of the output control unit 212. Furthermore, the communication unit 220 transmits the control signal for the output of the sound to be reproduced to each of the sound output units 102 under the control of the output control unit 212.

The communication unit 220 communicatively connects to a different device via, for example, a wired/wireless LAN (Local Area Network), Wi-Fi (registered trademark), Bluetooth (registered trademark), Near Field Communication, or a mobile communication network (LTE (Long Term Evolution) or 3G (third-generation mobile communication system)). Further, the details of the communication and the communication system implemented by the communication unit 220 are not limited to the above description.

(The Operation Input Unit 230)

The operation input unit 230 is a functional component that receives an operation instruction from the user and outputs the operation details to the control unit 210. The operation input unit 230 may be a touch sensor, a pressure sensor, or a proximity sensor. Alternatively, the operation input unit 230 may be a physical component, such as a keyboard, a mouse, a button, a switch, and a lever. Moreover, the type of the operation input unit 230 is not limited thereto.

(The Display Unit 240)

The display unit 240 is a functional component that outputs, for example, the setting screen used for setting a perceptual effect. The display unit 240 may be, for example, a liquid crystal display (LCD: Liquid Crystal Display), or an organic EL ((Electro Luminescence) display. Further, the type of the display unit 240 is not limited thereto.

(The Storage Unit 250)

The storage unit 250 is a functional component that stores various types of information. For example, the storage unit 250 stores programs, parameters, etc., used by each functional component of the server 200. Further, the details of the information stored in the storage unit 250 are not limited thereto.

The examples of the functional components of the server 200 have been described above. Further, the above-described functional components described with reference to FIG. 5 are merely examples, and the functional components of the server 200 are not limited to the examples. For example, the server 200 may not necessarily include all of the functional components illustrated in FIG. 5. Further, the functional component of the server 200 may be flexibly modified in accordance with the specification or the operation.

Furthermore, the server 200 is not limited to the PC illustrated in FIG. 1 and may be implemented by using a smartphone, a mobile phone terminal, a tablet terminal, a dedicated terminal, or the like. Further, at least part of the control unit 210 of the server 200 may be implemented by using a different server (or the tactile-sense application module 100) on the network. Further, the display unit 240 may be implemented by using a projector so that a setting screen, or the like, is projected onto a wall, a table, a screen, etc. In this case, with regard to a user's operation input to a projection screen, a touch operation on the projection screen may be detected by a camera that is separately installed.

(2-2. Functional Component of the Tactile-Sense Application Module 100)

Figure 6:
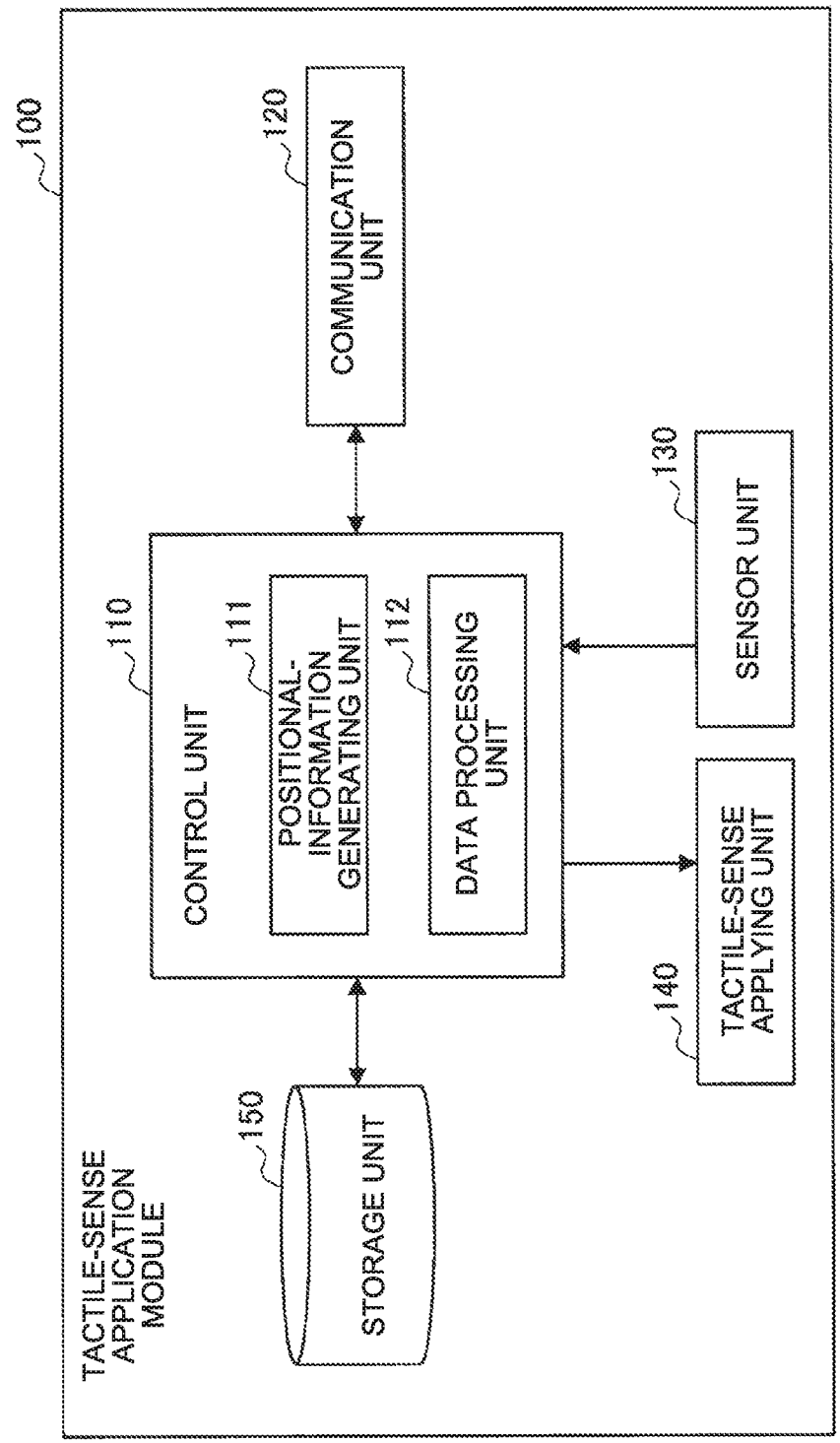
FIG. 6 is a block diagram illustrating an example of a functional component of a tactile-sense application module 100.

Next, with reference to FIG. 6, functional components of the tactile-sense application module 100 according to the present embodiment are described. FIG. 6 is a block diagram illustrating an example of a functional component of the tactile-sense application module 100 according to the present embodiment.

As illustrated in FIG. 6, the tactile-sense application module 100 includes a control unit 110, a communication unit 120, a sensor unit 130, a tactile-sense applying unit 140, and a storage unit 150. Furthermore, in this description, the tactile-sense application module 100 includes the tactile-sense applying unit 140; however, the tactile-sense applying unit 140 may include the function of the tactile-sense application module 100 (in other words, the tactile-sense applying unit 140 may be referred to as the tactile-sense application module 100, or vice versa).

(The Control Unit 110)

The control unit 110 is a functional component that controls each functional component of the tactile-sense application module 100 in an integrated manner. For example, the control unit 110 may control the activation or the termination of each functional component by using a control signal provided by the server 200. Further, the control details of the control unit 110 are not particularly limited. For example, the control unit 110 may perform processing (e.g., processing of the OS) that is typically performed in a general-purpose computer, a PC, a tablet PC, a smartphone, etc.

(A Positional-Information Generating Unit 111)

The positional-information generating unit 111 is a functional component that identifies the position of the tactile-sense application module 100 and generates the positional information. More specifically, the positional-information generating unit 111 searches for the different tactile-sense application module 100 located in the neighborhood by using a three-dimensional position sensor, or the like (what is called a distance sensor such as an infrared sensor, a beacon, or a camera) included in the sensor unit 130. When the different tactile-sense application module 100 located in the neighborhood is detected, the positional-information generating unit 111 outputs the relative positional relationship (e.g., a separation distance) between its own apparatus and the detected different tactile-sense application module 100 based on the sensor information provided by the sensor unit 130.

Furthermore, the method for identifying the position is not limited to the above description. For example, the positional-information generating unit 111 may identify the absolute position on the user's body (the target to which a tactile stimulus is applied) by using an attitude sensor, or the like (e.g., a gyro sensor or an acceleration sensor) included in the sensor unit 130. More specifically, when the tactile-sense application device 10 is attached to the user, the output of the attitude sensor, or the like, is different due to a difference in the attitude, the movement, etc., of the body site with which the tactile-sense application device 10 is in contact. Therefore, based on the feature value of the sensor information from the attitude sensor, or the like, the positional-information generating unit 111 may sometimes identify the position of the body with which its own apparatus is in contact.

Furthermore, the positional-information generating unit 111 generates the positional information that is the information about the position of its own apparatus identified by using the above-described method. The positional information may include the information (hereinafter also referred to as "relative positional information" for convenience) about the relative positional relationship with the different tactile-sense application module 100 or the information (hereinafter also referred to as "absolute positional information" for convenience) about the absolute position on the user's body (the target to which a tactile stimulus is applied) identified by using the above-described method. Further, the positional-information generating unit 111 may identify the position of the different tactile-sense application module 100 as appropriate as well as its own apparatus and generate the positional information.

Here, the details of the relative positional information are not particularly limited. For example, the relative positional information may be represented by using a three-dimensional coordinate system with the predetermined tactile-sense application module 100 as a reference point (e.g., a three-dimensional orthogonal coordinate system or a three-dimensional oblique coordinate system in which the three axes are the three lines connecting from the tactile-sense application module 100 serving as a reference to the three other tactile-sense application modules 100) or may be represented by using an angle and a separation distance with respect to the reference point.

Furthermore, the details of the absolute positional information are also not particularly limited. For example, the absolute positional information may be represented by using each site of the body (e.g., head, neck, shoulder, waist, elbow, wrist, knee, ankle, or each finger) or may be represented by using any of the predetermined points (e.g., a head first point, a head second point) of each site.

Furthermore, the positional-information generating unit 111 may identify the position of the different tactile-sense application module 100. For example, the positional-information generating unit 111 may recognize the relative positional relationship (e.g., a separation distance) between its own apparatus and the different tactile-sense application module 100 by using a three-dimensional position sensor, or the like (what is called a distance sensor such as an infrared sensor, a beacon, or a camera) included in the sensor unit 130. In this case, the positional-information generating unit 111 may generate the positional information on the different tactile-sense application module 100 and provide the positional information to the different tactile-sense application module 100 via the communication unit 120. Thus, for example, even in a case where each of the tactile-sense application modules 100 has a different function and performance and there is the tactile-sense application module 100 that is not able to output the positional information with high accuracy (or does not have the function to output the positional information), the tactile-sense application modules 100 may recognize their positions with high accuracy. Furthermore, when there is the tactile-sense application module 100 whose remaining amount of electric power is less than a predetermined amount, the tactile-sense application module 100 may receive the positional information provided by the different tactile-sense application module 100 without generating the positional information by itself so as to reduce the power consumption.

Furthermore, the method for identifying the position by the positional-information generating unit 111 is not limited to the above description. For example, the positional-information generating unit 111 may identify the position by using the sensor information provided by an external device as well as the sensor information provided by the sensor unit 130 of its own apparatus. For example, the positional-information generating unit 111 may acquire sensor information from a three-dimensional position sensor, or the like (what is called a distance sensor such as an infrared sensor, a beacon, or a camera) included in the external device via the communication unit 120 and analyze the sensor information to identify the position of its own apparatus. Thus, the positional-information generating unit 111 may identify the position as appropriate even when the sensor unit 130 outputs low-accuracy sensor information or when the sensor unit 130 does not include a desired sensor.

The positional-information generating unit 111 stores the generated positional information in the storage unit 150. Furthermore, the positional-information generating unit 111 continuously recognizes changes in its position in accordance with a predetermined trigger (e.g., a request signal from the server 200) or at a predetermined timing (e.g., periodically) to update the positional information.

Furthermore, the positional-information generating unit 111 may generate the positional information on the different tactile-sense application module 100 (particularly, the tactile-sense application module 100 in the neighborhood) by itself or acquire it from the different tactile-sense application module 100 and store it in the storage unit 150 as appropriate. Further, the positional-information generating unit 111 may analyze the sensor information to predict the position. Thus, a data processing unit 112 may change the tactile control signal by using the positional information indicating the predicted position at the time of the actual application of a tactile stimulus so as to achieve a more appropriate tactile stimulus. Here, the method for predicting the position is not particularly limited, and a known prediction technique may be used.

(The Data Processing Unit 112)

The data processing unit 112 is a functional component that changes a tactile control signal in accordance with the positional information and the perceptual setting information on its own apparatus. More specifically, the data processing unit 112 receives the tactile control signal and the perceptual setting information provided by the server 200 and then acquires the positional information generated by the positional-information generating unit 111 from the storage unit 150 (functions as an acquiring unit) to recognize the position of its own apparatus and the position of the different tactile-sense application module 100 as appropriate.

Further, the data processing unit 112 identifies the tactile-sense application modules 100 located in the neighborhood of the perceptual position specified by the perceptual setting information. Then, the data processing unit 112 calculates the output intensity of its own apparatus or the output intensity of the different tactile-sense application module 100 as appropriate based on the positional relationship between each of the tactile-sense application modules 100 and the specified perceptual position and the perceptual intensity specified by the perceptual setting information. Specifically, the data processing unit 112 adjusts the output intensity of its own apparatus or the different tactile-sense application module 100 based on the perceptual position and the perceptual intensity specified by the perceptual setting information and the distance from the tactile-sense application modules 100 located in the neighborhood. The technique disclosed in PCT/JP2017/14379 may be used to adjust the output intensities of the tactile-sense application modules 100 so as to apply a predetermined tactile stimulus to the target position on the user's body.

For example, when the first tactile-sense application module 100 (e.g., its own apparatus) and the second tactile-sense application module 100 (e.g., the different tactile-sense application module 100) are located in the neighborhood of the perceptual position specified by the perceptual setting information, the data processing unit 112 calculates the output intensity of the first tactile-sense application module 100 based on the distance between the application position of the first tactile-sense application module 100 on the user's body and the target perceptual position. Moreover, the data processing unit 112 may determine the output intensity of the second tactile-sense application module 100 based on the distance between the application position of the second tactile-sense application module 100 on the user's body and the target perceptual position as appropriate.

The above-described function is described below in more detail. First, an example of adjusting the output intensities of the two tactile-sense application modules 100 when the target perceptual position is located between the application positions of the two tactile-sense application modules 100 is described. For example, the data processing unit 112 determines the output intensity of the first tactile-sense application module 100 and the output intensity of the second tactile-sense application module 100 as appropriate based on the positional relationship between the target perceptual position and the intermediate position between the application position of the first tactile-sense application module 100 (e.g., its own apparatus) and the application position of the second tactile-sense application module 100 (e.g., the different tactile-sense application module 100).

For example, the data processing unit 112 may determine the output intensities of the first tactile-sense application module 100 and the second tactile-sense application module 100 such that the total value of the output intensity of the first tactile-sense application module 100 and the output intensity of the second tactile-sense application module 100 increases as the distance between the intermediate position and the target perceptual position decreases. Furthermore, when the target perceptual position is located closer to the application position of the first tactile-sense application module 100 than the application position of the second tactile-sense application module 100, the data processing unit 112 may determine the output intensity of the first tactile-sense application module 100 such that the output intensity of the first tactile-sense application module 100 increases as the distance between the application position of the first tactile-sense application module 100 and the target perceptual position increases. Moreover, the same holds for the second tactile-sense application module 100 (that is, the relation is reversed).

Furthermore, the data processing unit 112 changes the tactile control signal provided by the server 200 based on the output intensity determined by using the above-described method. For example, the data processing unit 112 executes amplification, attenuation, or the like, of the tactile control signal on the basis of the output intensity.

Furthermore, the data processing unit 112 may also perform the process to change the tactile control signal by using the sensor information provided by the sensor unit 130. For example, in a case where the tactile-sense applying unit 140 applies a temperature sense, the data processing unit 112 may apply a more accurate temperature sense based on the sensor information provided by the temperature sensor of the sensor unit 130 (for example, the data processing unit 112 may adjust the output intensity of the tactile-sense applying unit 140 until the application target has the target temperature). Furthermore, the data processing unit 112 may calculate the heat capacity, or the like, of the application target based on the sensor information provided by the temperature sensor to recognize the likelihood of increase in the temperature (or the likelihood of decrease in the temperature) of the application target so as to adjust the output intensity of the tactile-sense applying unit 140. For example, when the application target has a high heat capacity (in other words, the temperature is unlikely to increase), the data processing unit 112 may change the output intensity so as to be higher.

Furthermore, when the tactile-sense applying unit 140 applies a vibration, the data processing unit 112 may recognize the transmission characteristics of the vibration based on the sensor information provided by the acceleration sensor so as to adjust the output intensity of the tactile-sense applying unit 140. For example, in a case where the vibration is difficult to transmit, the data processing unit 112 may change the output intensity so as to be higher.

Furthermore, when the tactile-sense applying unit 140 applies a vibration, a sense of force, etc., the data processing unit 112 may recognize the strength with which the tactile-sense application module 100 is secured to the body based on the sensor information provided by the pressure sensor so as to adjust the output intensity of the tactile-sense applying unit 140. For example, when the tactile-sense application module 100 is secured to the body with a low strength, the data processing unit 112 may change the output intensity so as to be higher.

Furthermore, basically, the tactile-sense application module 100 calculates the output intensity of its own apparatus and changes the tactile control signal; however, it may calculate the output intensity of the different tactile-sense application module 100 as appropriate. For example, the data processing unit 112 may calculate the output intensity of the different tactile-sense application module 100 by using the above-described method (the same method as that for its own apparatus). Further, the data processing unit 112 may set the average value of the output intensities of the tactile-sense application modules 100 located in the neighborhood (within a predetermined range) of each other as the output intensities of the tactile-sense application modules 100. Further, the data processing unit 112 may set any one of the output intensities of the tactile-sense application modules 100 located in the neighborhood (within a predetermined range) of each other as the output intensities of the other tactile-sense application modules 100. Then, after calculating the output intensities of the other tactile-sense application modules 100, the data processing unit 112 provides the information on the output intensities (or the tactile control signal that has been changed in accordance with the output intensity) to the other tactile-sense application modules 100 via the communication unit 120.

Thus, for example, even in a case where each of the tactile-sense application modules 100 has a different function and performance and there is the tactile-sense application module 100 that is not able to calculate the output intensity with high accuracy (or does not have the function to calculate the output intensity), each of the tactile-sense application modules 100 may perform the process to change the tactile control signal as appropriate. Further, when there is the tactile-sense application module 100 whose remaining amount of electric power is lower than a predetermined amount, the tactile-sense application module 100 may receive the information on the output intensity or the changed tactile control signal provided by the different tactile-sense application module 100 without calculating the output intensity or changing the tactile control signal by itself so as to reduce the power consumption.

Furthermore, the data processing unit 112 may change any parameter (e.g., a frequency in the waveform information, a data format, or a modulation method) other than the output intensity (corresponding to the amplitude in the waveform information). Further, in a case where the tactile-sense application module 100 is able to output a sound, a video, etc., the data processing unit 112 may change the output of a sound, a video, or the like, based on the positional information and the perceptual setting information.

(The Communication Unit 120)

The communication unit 120 is a functional component that transmits and receives information to and from a different apparatus. For example, the communication unit 120 receives the tactile control signal and the perceptual setting information from the server 200. Furthermore, the communication unit 120 may transmit and receive a tactile control signal, perceptual setting information, sensor information, positional information, and the like, to and from the different tactile-sense application module 100.

The communication unit 120 communicatively connects to a different device via, for example, a wired/wireless LAN (Local Area Network), Wi-Fi (registered trademark), Bluetooth (registered trademark), Near Field Communication, or a mobile communication network (LTE (Long Term Evolution) or 3G (third-generation mobile communication system)). Further, the details of the communication and the communication system implemented by the communication unit 120 are not limited to the above description.

(The Sensor Unit 130)

The sensor unit 130 is a functional component that generates sensor information used for the process of identifying the position of the tactile-sense application module 100, the process of changing the tactile control signal, and the like. For example, the sensor unit 130 includes a three-dimensional position sensor (what is called a distance sensor such as an infrared sensor, a beacon, or a camera), an attitude sensor (a gyro sensor, an acceleration sensor, etc.), a temperature sensor, or a pressure sensor. Furthermore, the types of sensors included in the sensor unit 130 are not limited thereto.

(The Tactile-Sense Applying Unit 140)

The tactile-sense applying unit 140 is a functional component that applies a tactile stimulus to the user by using the tactile control signal changed by the data processing unit 112. For example, the tactile-sense applying unit 140 may be an actuator (e.g., ERM (eccentric motor), LRA (linear resonant actuator), or VCM (voice coil motor)) that applies a vibration, may be an electric element that applies a sense of force, or may be a temperature change element (e.g., a Peltier element) that applies a temperature sense. Moreover, as described above, the tactile sense applied by the tactile-sense applying unit 140 is not particularly limited.

(The storage unit 150)

The storage unit 150 is a functional component that stores various types of information. For example, the storage unit 150 stores the tactile control signal and the perceptual setting information provided by the server 200. Further, the storage unit 150 may previously store these pieces of information. For example, the server 200 may provide the tactile control signal and the perceptual setting information to the tactile-sense application module 100 before the content is provided, or the storage unit 150 may store the tactile control signal and the perceptual setting information at the time of manufacturing of the tactile-sense application module 100. Thus, instead of transmitting these pieces of information, the server 200 may transmit the information (e.g., the ID of a tactile control signal or the ID of perceptual setting information) with which these pieces of information is identifiable so as to achieve the application of a tactile stimulus. In other words, the volume of information to be communicated may be reduced. Further, the storage unit 150 also stores the positional information, the sensor information, the program or parameter used by each functional component, and the like. Moreover, the details of the information stored in the storage unit 150 are not limited thereto.

The examples of the functional components of the tactile-sense application module 100 have been described above. Further, the above-described functional components described with reference to FIG. 6 are merely examples, and the functional components of the tactile-sense application module 100 are not limited to the examples. For example, the tactile-sense application module 100 may not necessarily include all of the functional components illustrated in FIG. 6. Further, the functional component may be different for each of the tactile-sense application modules 100 (for example, there may be the tactile-sense application module 100 dedicated to communicate with the server 200 or the tactile-sense application module 100 dedicated to apply a tactile stimulus). Further, at least part of the control unit 110 of the tactile-sense application module 100 may be implemented by using a different server (e.g., the server 200) on the network. Moreover, the functional component of the tactile-sense application module 100 may be flexibly modified in accordance with the specification or the operation.

3. Operation Processing

In the above description, the functional components of the server 200 and the tactile-sense application module 100 according to the present embodiment have been described. Next, the operation processing of the server 200 and the tactile-sense application module 100 according to the present embodiment is described in detail with reference to FIG. 7 to FIG. 11.

(3-1. Operation to Identify a Position by the Tactile-Sense Application Module 100)

Figure 7:
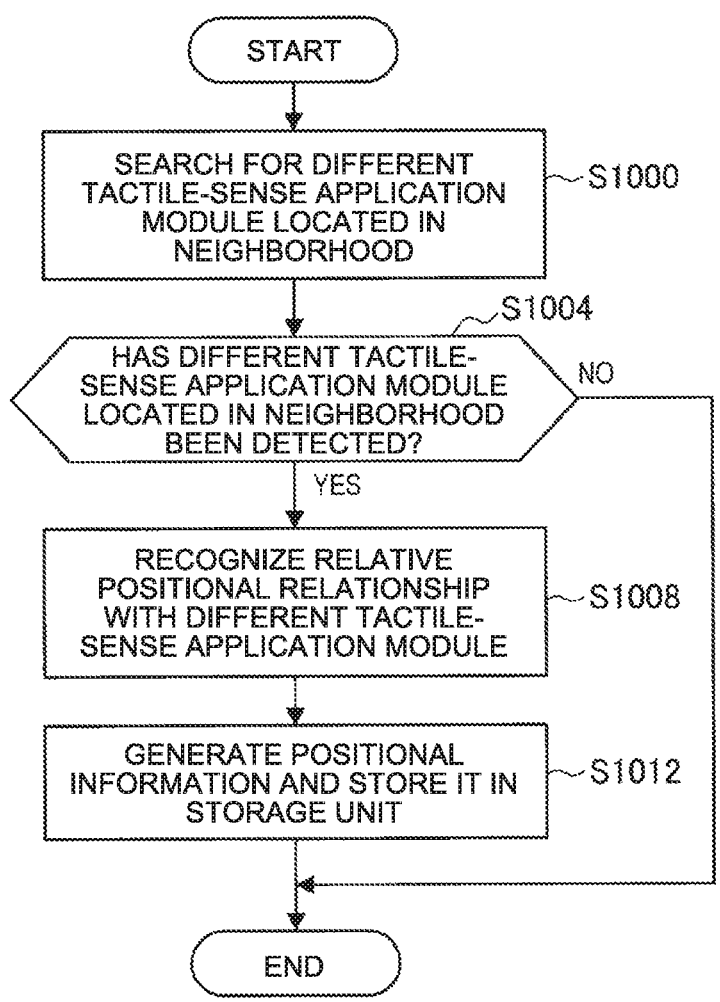
FIG. 7 is a flowchart illustrating an example of the operation of identifying a position by the tactile-sense application module 100.

First, the operation to identify the position by the tactile-sense application module 100 is described with reference to FIG. 7. FIG. 7 is a flowchart illustrating an example of the operation to identify the position by the tactile-sense application module 100.

At Step S1000, the positional-information generating unit 111 of the tactile-sense application module 100 searches for the different tactile-sense application module 100 located in the neighborhood by using a three-dimensional position sensor, or the like (what is called a distance sensor such as an infrared sensor, a beacon, or a camera) included in the sensor unit 130. When the different tactile-sense application module 100 located in the neighborhood has been detected (Step S1004/Yes), the positional-information generating unit 111 recognizes the relative positional relationship (e.g., a separation distance) between its own apparatus and the detected different tactile-sense application module 100 based on the sensor information at Step S1008. Furthermore, as described above, the positional-information generating unit 111 may recognize the absolute position on the user's body (the target to which a tactile stimulus is applied) based on the sensor information.

At Step S1012, the positional-information generating unit 111 generates the positional information including the relative positional information or the absolute positional information based on the recognition result and stores the positional information in the storage unit 150 so as to terminate the series of processes. As described above, the positional-information generating unit 111 performs the process in FIG. 7 in accordance with a predetermined trigger (e.g., a request signal from the server 200) or at a predetermined timing (for example, periodically) to continuously recognize changes in its position and updates the positional information.

(3-2. Operation to Output a Tactile Control Signal)

Figure 8:
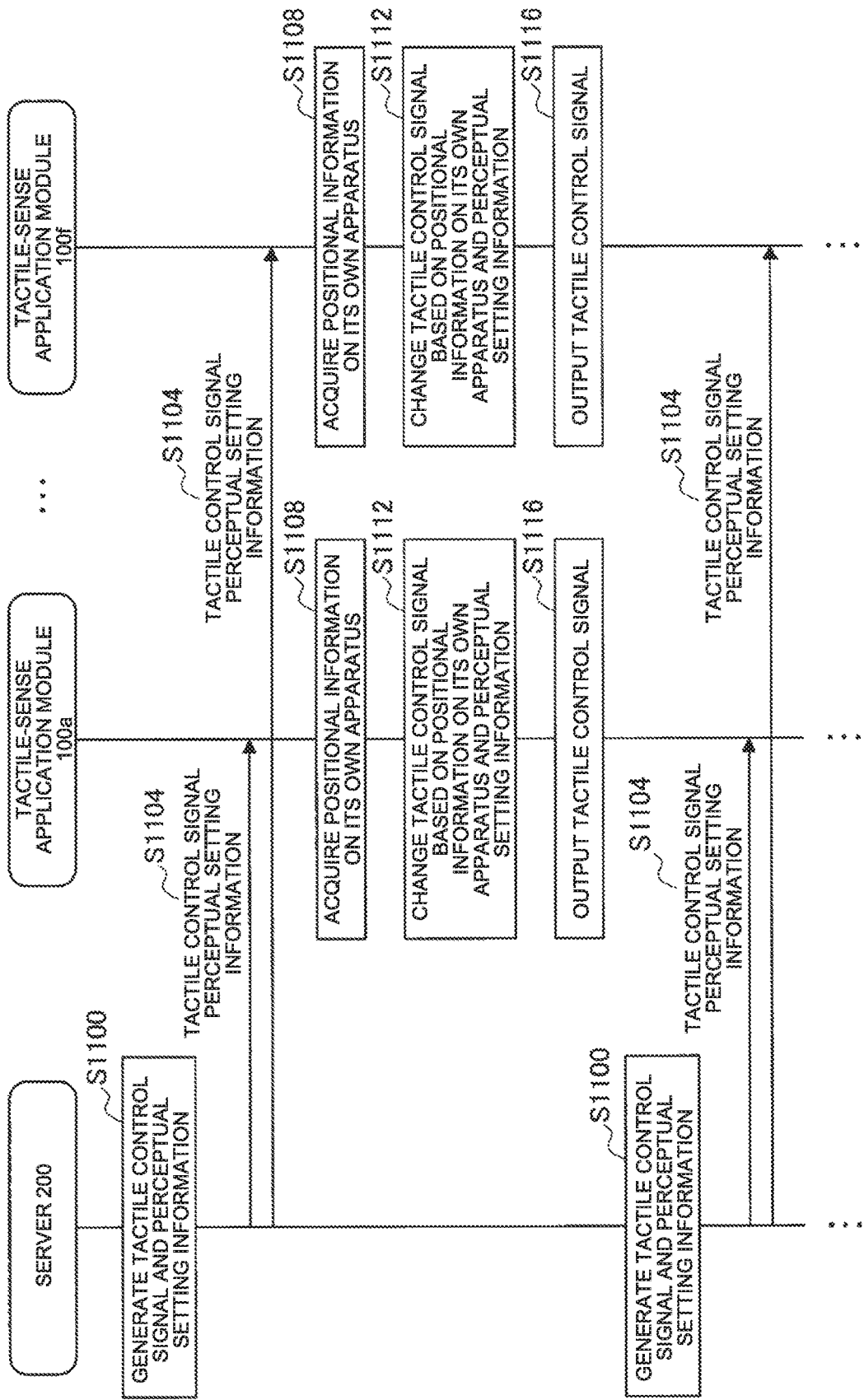
FIG. 8 is a sequence diagram illustrating an example of the operation of outputting a tactile control signal by the server 200 and the tactile-sense application module 100.

Next, the operation performed to output a tactile control signal by the server 200 and the tactile-sense application module 100 in cooperation is described. FIG. 8 is a sequence diagram illustrating an example of the operation to output a tactile control signal. Here, as an example, it is assumed that the tactile-sense application module 100a to the tactile-sense application module 100f are used as the tactile-sense application module 100.

At Step S1100, the perceptual-position/intensity determining unit 211 of the server 200 determines (calculates) the content (e.g., the vibrational frequency or amplitude) of the perception for the tactile-sense application modules 100 corresponding to the target perceptual position and generates the tactile control signal or the perceptual setting information. At Step S1104, the communication unit 220 transmits (broadcasts) the tactile control signal and the perceptual setting information to each of the tactile-sense application modules 100 at a predetermined timing (for example, at each timing of the reproduced content) under the control of the output control unit 212.

At Step S1108, after receiving the tactile control signal and the perceptual setting information, the data processing unit 112 of each of the tactile-sense application modules 100 acquires the positional information generated by the positional-information generating unit 111 from the storage unit 150. At Step S1112, the data processing unit 112 changes the tactile control signal based on the positional information on its own apparatus and the perceptual setting information. The data processing unit 112 calculates the output intensity of its own apparatus based on, for example, the perceptual position and the perceptual intensity specified by the perceptual setting information and the relative positional relationship between its own apparatus and the tactile-sense application modules 100 located in the neighborhood and executes amplification, attenuation, or the like, of the tactile control signal on the basis of the output intensity.

At Step S1116, the tactile-sense applying unit 140 outputs the changed tactile control signal to apply a tactile stimulus to the user. Then, for example, the process from Step S1100 to S1116 described above is continued until the reproduced content is finished. This allows the server 200 and the tactile-sense application module 100 to provide the user with the content accompanied with a tactile stimulus.

Furthermore, the operation to output the tactile control signal is not limited to the example in FIG. 8. For example, as illustrated in FIG. 9, at least any one of the tactile-sense application modules 100 may perform the function to communicate with the server 200 so as to provide the tactile control signal and the perceptual setting information to the different tactile-sense application module 100.

Figure 9:
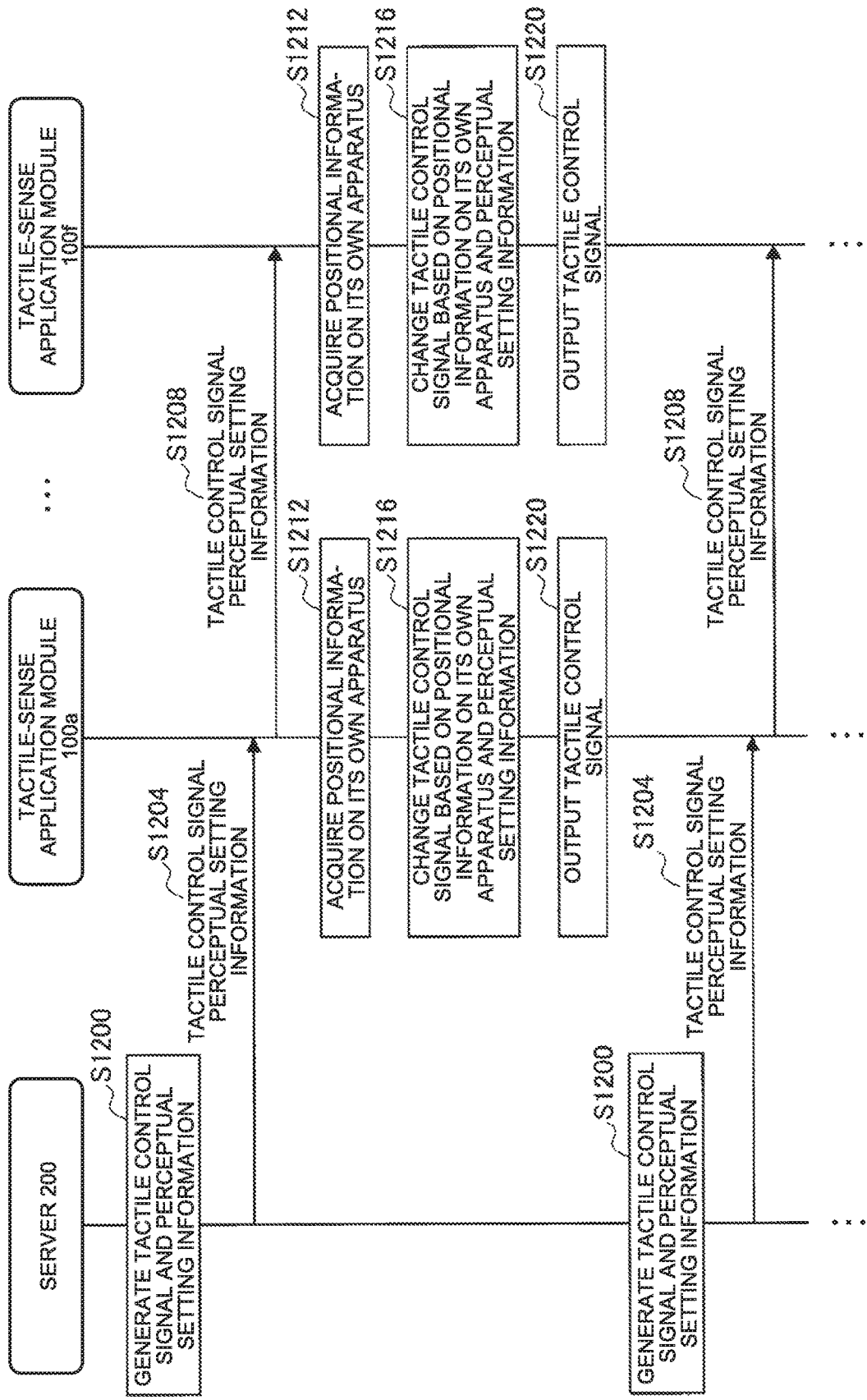
FIG. 9 is a sequence diagram illustrating an example of the operation of outputting a tactile control signal by the server 200 and the tactile-sense application module 100.

More specifically, after the perceptual-position/intensity determining unit 211 of the server 200 generates the tactile control signal or the perceptual setting information at Step S1200 of FIG. 9, the communication unit 220 transmits the tactile control signal and the perceptual setting information to only the tactile-sense application module 100a that is one of the tactile-sense application modules 100 at Step S1204. Then, at Step S1208, the communication unit 120 of the tactile-sense application module 100a transmits the tactile control signal and the perceptual setting information to the tactile-sense application module 100b to the tactile-sense application module 100f. The operations at Steps S1212 to Step S1220 are the same as the operations at Step S1108 to Step S1116 in FIG. 8, and therefore the description thereof is omitted.

Furthermore, in some cases, the communication band between the server 200 and each of the tactile-sense application modules 100 is limited or there is the tactile-sense application module 100 that has a low communication performance (or does not have the function to communicate with the server 200). In such a case, too, as in FIG. 9, at least one of the tactile-sense application modules 100 communicates with the server 200 in place of the other tactile-sense application modules 100 so that each of the tactile-sense application modules 100 may perform the operation to output the tactile control signal as appropriate. Moreover, the specific tactile-sense application module 100 may receive, from the server 200, various types of software (for example, updated latest software) executed by each of the tactile-sense application modules 100 as well as the tactile control signal and the perceptual setting information and provide it to the other tactile-sense application modules 100.

Here, as described above, the tactile control signal or the perceptual setting information may be provided by the server 200 to the tactile-sense application module 100 before the content is provided or may be stored in the storage unit 150 at the time of manufacturing of the tactile-sense application module 100. Therefore, an example of the operation of outputting the tactile control signal in a case where the tactile control signal is provided by the server 200 before the content is provided is subsequently described with reference to FIG. 10.

Figure 10:
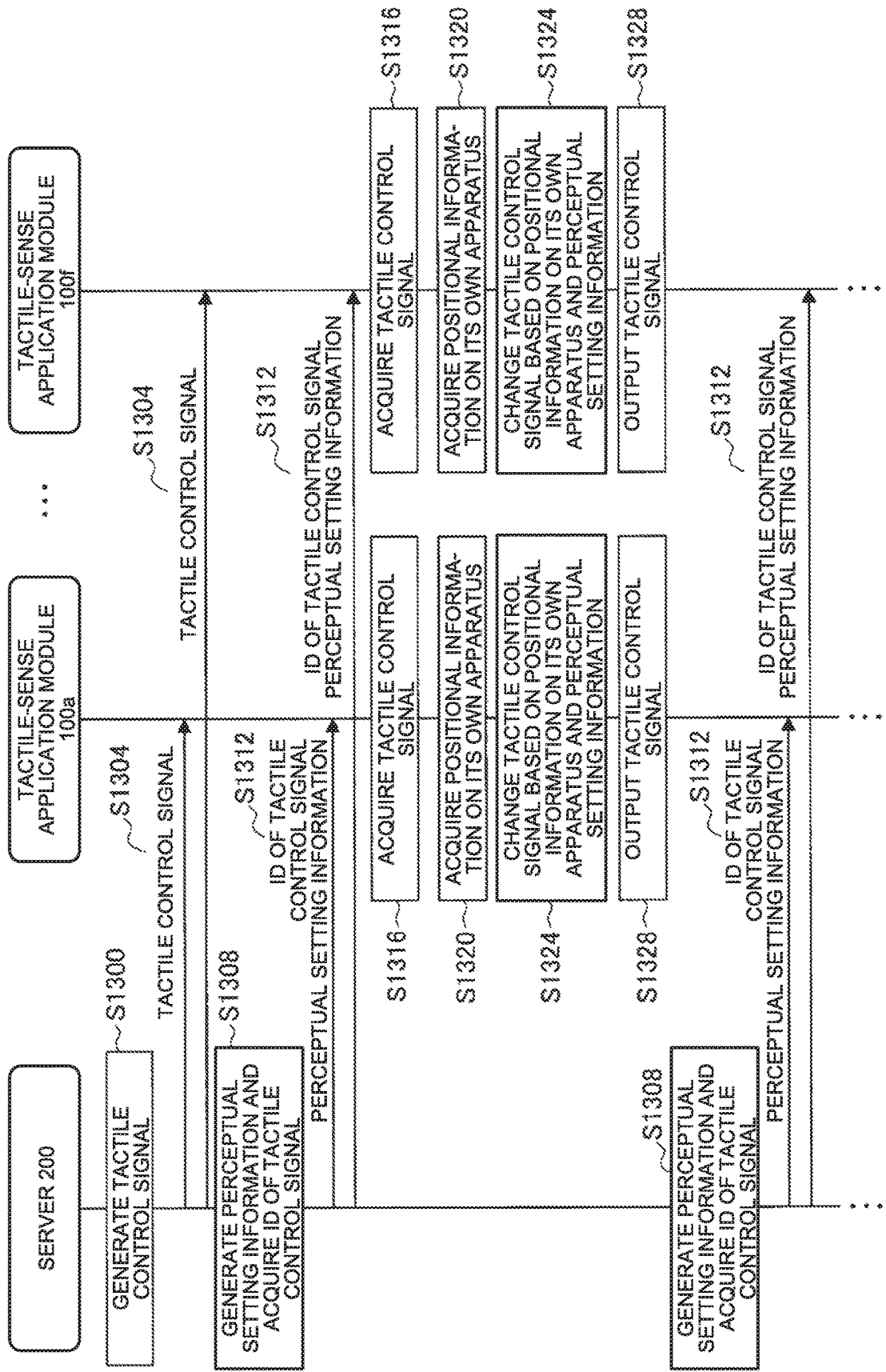
FIG. 10 is a sequence diagram illustrating an example of the operation of outputting a tactile control signal by the server 200 and the tactile-sense application module 100.

After the perceptual-position/intensity determining unit 211 of the server 200 generates one or two or more tactile control signals before the content is reproduced at Step S1300 of FIG. 10, the communication unit 220 transmits (broadcasts) the tactile control signal to each of the tactile-sense application modules 100 at Step S1304. Further, each of the tactile-sense application modules 100 stores the received one or two or more tactile control signals in the storage unit 150.

Then, at the time of the reproduction of the content, at Step S1308, the perceptual-position/intensity determining unit 211 of the server 200 determines (calculates) the content (for example, the vibrational frequency or amplitude) of the perception for the tactile-sense application modules 100 corresponding to the target perceptual position, generates the perceptual setting information, and acquires the ID for identifying the tactile control signal. At Step S1312, the communication unit 220 transmits (broadcasts) the perceptual setting information and the ID of the tactile control signal to each of the tactile-sense application modules 100 at a predetermined timing (for example, at each timing of the reproduced content) under the control of the output control unit 212.

At Step S1316, after receiving the perceptual setting information and the ID of the tactile control signal, the data processing unit 112 of each of the tactile-sense application modules 100 uses the ID of the tactile control signal to acquire the tactile control signal from the storage unit 150. As the operations at Step S1320 to Step S1328 are the same as the operations at Step S1108 to Step S1116 in FIG. 8, the description is omitted. Furthermore, for example, the process from Step S1308 to Step S1328 described above is continued until the reproduced content is finished. The transmission of the ID of the tactile control signal instead of the tactile control signal may reduce the volume of information communicated by the server 200 and the tactile-sense application module 100 according to the present disclosure.

In the example described above, each of the tactile-sense application modules 100 changes the tactile control signal; however, the server 200 may change the tactile control signal. Therefore, with reference to FIG. 11, an example in which the server 200 changes the tactile control signal in accordance with the perceptual setting information and the positional information on each of the tactile-sense application modules 100 is described. Moreover, in this case, it is assumed that the server 200 includes a functional component (hereinafter referred to as "data processing unit") equivalent to the data processing unit 112 of the tactile-sense application module 100.

Figure 11:
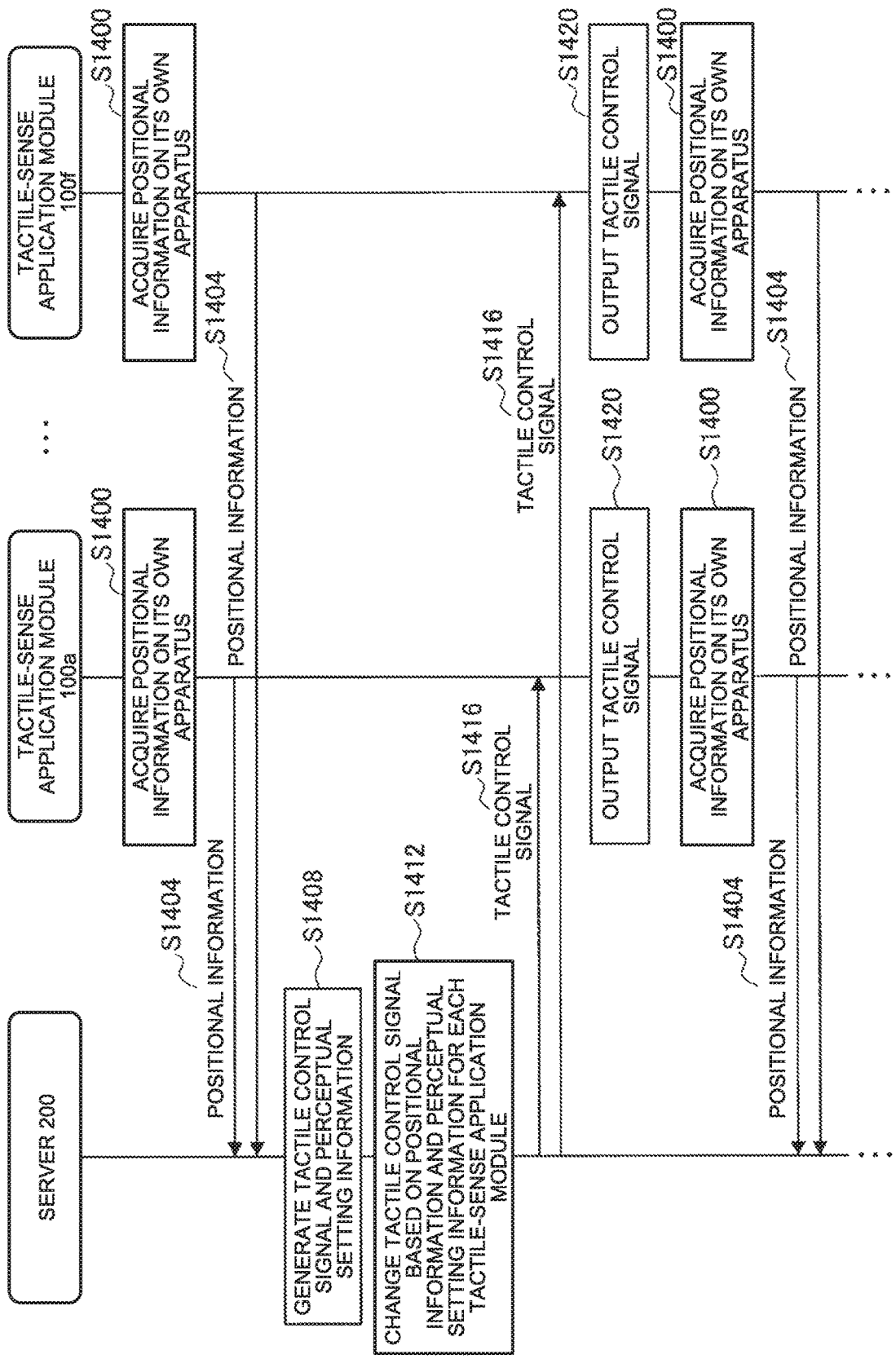
FIG. 11 is a sequence diagram illustrating an example of the operation of outputting a tactile control signal by the server 200 and the tactile-sense application module 100.

At Step S1400 of FIG. 11, the data processing unit 112 of each of the tactile-sense application modules 100 acquires the positional information generated by the positional-information generating unit 111 from the storage unit 150, and the communication unit 120 transmits the positional information to the server 200 at Step S1404. Further, the trigger or the timing for performing these processes are not particularly limited. For example, the processes may be performed by using a request signal from the server 200 as a trigger or may be performed at a regular timing.

At Step S1408, the perceptual-position/intensity determining unit 211 of the server 200 determines (calculates) the content (for example, the vibrational frequency or amplitude) of the perception for the tactile-sense application modules 100 corresponding to the target perceptual position and generates the tactile control signal or the perceptual setting information. At Step S1412, the data processing unit of the server 200 changes the tactile control signal for each of the tactile-sense application modules 100 based on the positional information on each of the tactile-sense application modules 100 and the perceptual setting information. Then, at Step S1416, the communication unit 220 of the server 200 transmits the changed tactile control signal to each of the tactile-sense application modules 100. At Step S1420, the tactile-sense applying unit 140 of each of the tactile-sense application modules 100 outputs the tactile control signal (without the change process by the data processing unit 112) so as to apply a tactile stimulus to the user. Then, for example, the process from Step S1400 to S1420 described above is continued until the reproduced content is finished.

Thus, the server 200 changes the tactile control signal so as to reduce the processing load of each of the tactile-sense application modules 100. Furthermore, in the example of FIG. 11, the data processing unit 112 of the tactile-sense application module 100 may change the tactile control signal as appropriate. For example, when there is a delay in the process of changing the tactile control signal by the server 200, the data processing unit 112 of the tactile-sense application module 100 may change the tactile control signal again based on the latest positional information.

Furthermore, the steps in the flowchart and the sequence diagrams illustrated in FIG. 7 to FIG. 11 do not necessarily need to be performed in time sequence in the order described. That is, the steps in the flowchart or the sequence diagrams may be performed in an order different from the order described or may be performed in parallel.

4. Hardware Configuration

In the above description, the operation processing of the server 200 and the tactile-sense application module 100 according to the present embodiment has been described in detail. Next, with reference to FIG. 12, an example of the hardware configuration of an information processing apparatus 900 that implements the server 200 and the tactile-sense application module 100 is described.

Figure 12:
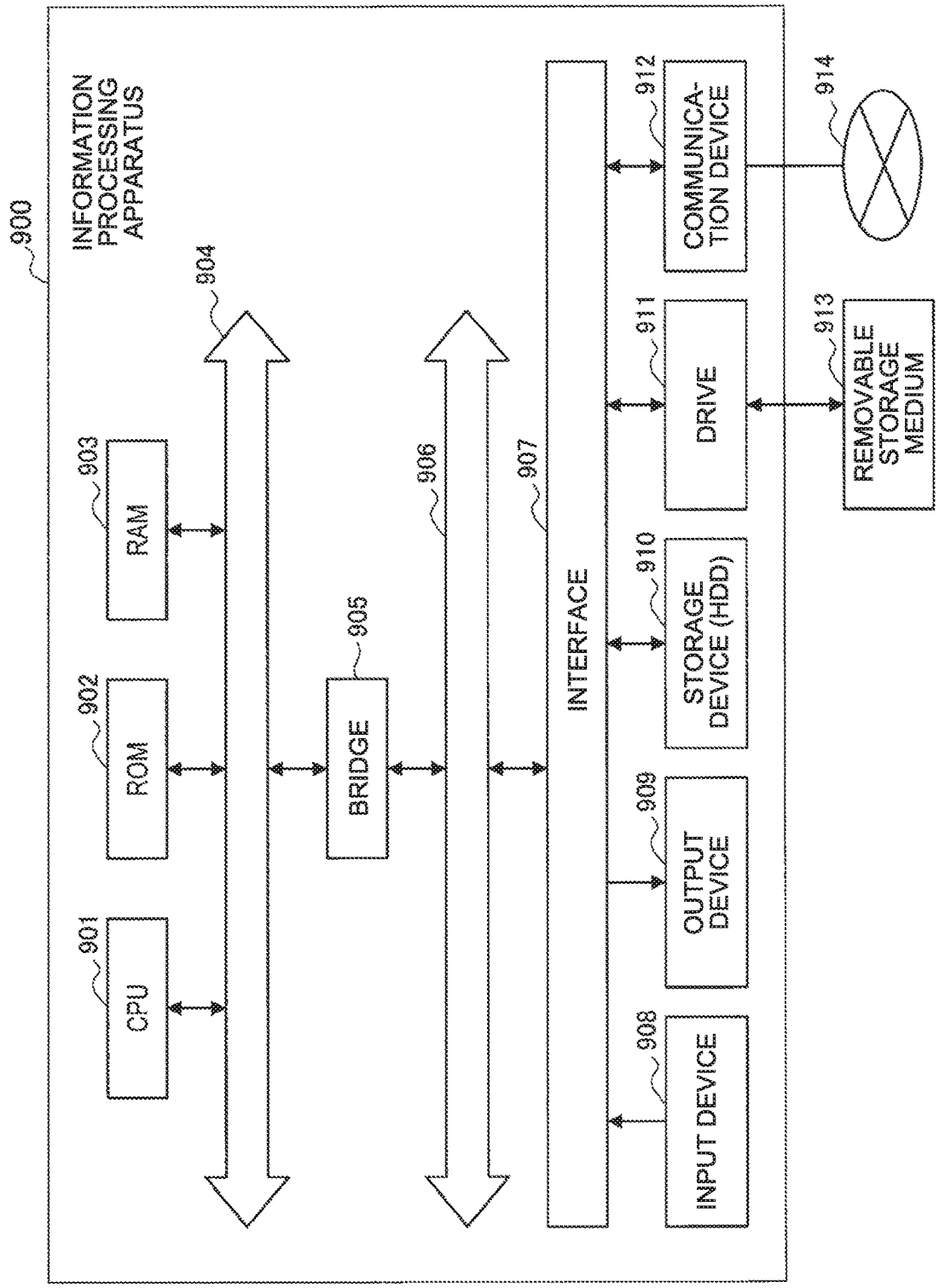
FIG. 12 is a block diagram illustrating an example of the hardware configuration of the tactile-sense application module 100 or the server 200.

FIG. 12 is a diagram illustrating a hardware configuration of the information processing apparatus 900. The information processing apparatus 900 includes a CPU (Central Processing Unit) 901, a ROM (Read Only Memory) 902, a RAM (Random Access Memory) 903, a host bus 904, a bridge 905, an external bus 906, an interface 907, an input device 908, an output device 909, a storage device (HDD) 910, a drive 911, and a communication device 912.

The CPU 901 functions as an arithmetic processing device and a control device to control the overall operation in the information processing apparatus 900 in accordance with various programs. Further, the CPU 901 may be a microprocessor. The ROM 902 stores a program, operation parameter, and the like, used by the CPU 901. The RAM 903 temporarily stores a program used during the execution of the CPU 901, a parameter changed as appropriate during the execution, and the like. They are coupled to each other via the host bus 904 that includes a CPU bus, etc. Due to the cooperation of the CPU 901, the ROM 902, and the RAM 903, each of the functions of the control unit 210 in the server 200 and the control unit 110 and the sensor unit 130 in the tactile-sense application module 100 are performed.

The host bus 904 is coupled to the external bus 906, such as a PCI (Peripheral Component Interconnect/Interface) bus, via the bridge 905. Furthermore, the host bus 904, the bridge 905, and the external bus 906 do not necessarily need to be separated from each other, and their functions may be implemented in the single bus.

The input device 908 includes, for example, an input means to input information by the user, such as a mouse, a keyboard, a touch panel, a button, a microphone, a switch, and a lever, and an input control circuitry that generates an input signal based on an input from the user and outputs it to the CPU 901. The user of the information processing apparatus 900 may operate the input device 908 to input various types of information and instruct a processing operation to each device. The input device 908 implements the function of the operation input unit 230 of the server 200.

The output device 909 includes a display device, such as a CRT (Cathode Ray Tube) display device, a liquid crystal display (LCD) device, an OLED (Organic Light Emitting Diode) device, and a lamp. Further, the output device 909 includes a sound output device such as a speaker and headphones. The output device 909 outputs, for example, the reproduced content. Specifically, the display device displays various types of information such as reproduced video data in text or an image. Further, the sound output device converts the reproduced sound data, or the like, into a sound and outputs it. In particular, the output device 909 according to the present disclosure includes an actuator (e.g., an ERM (eccentric motor), an LRA (linear resonant actuator), or a VCM (voice coil motor)) that applies a vibration, an electrical stimulus element that applies a sense of force, a temperature change element, or the like (e.g., a Peltier element) that applies a temperature sense. The output device 909 implements the functions of the display unit 240 of the server 200 and the tactile-sense applying unit 140 of the tactile-sense application module 100.

The storage device 910 is a device for data storage. The storage device 910 may include a storage medium, a recording device that records data in a storage medium, a reading device that reads data from a storage medium, a deletion device that deletes data recorded in a storage medium, and the like. The storage device 910 includes, for example, an HDD (Hard Disk Drive). The storage device 910 drives a hard disk to store programs and various types of data executed by the CPU 901. The storage device 910 implements the functions of the storage unit 250 of the server 200 and the storage unit 150 of the tactile-sense application module 100.

The drive 911 is a reader/writer for a storage medium and is built in or externally attached to the information processing apparatus 900. The drive 911 reads information recorded in a removable storage medium 913 such as a magnetic disk, an optical disk, a magneto-optical disk, or a semiconductor memory that is attached, and outputs it to the RAM 903. Furthermore, the drive 911 may also write information in the removable storage medium 913.

The communication device 912 is, for example, a communication interface including a communication device, or the like, for connecting to the communication network 914. The communication device 912 implements the functions of the communication unit 220 of the server 200 and the communication unit 120 of the tactile-sense application module 100.

5. Conclusion

As described above, according to the present disclosure, the tactile control signal is changed as appropriate by using the positional information on the tactile-sense application modules 100 and the perceptual setting information. Thus, even in a case where the installation layout of the tactile-sense application modules 100 is changed or the position of the tactile-sense application module 100 with respect to the body is changed, the tactile-sense application module 100 may be flexible depending on the position so as to achieve the same perception effect as that at the time of recording of the tactile control signal.

Although the preferred embodiments of the present disclosure have been described above in detail with reference to the accompanying drawings, the technical scope of the present disclosure is not limited to the examples. It is apparent that those skilled in the art according to the present disclosure may make various modifications and variations within the scope of the technical idea described in claims, and it is naturally understood that they also belong to the technical scope of the present disclosure.

For example, although the tactile-sense application device 10 is used by the single user in the example described above, the tactile-sense application device 10 may be used by multiple users. For example, in the assumed case, the tactile-sense application device 10 forms a floor surface (for example, the case in which the tactile-sense application device 10 is a member used for the floor surface or is a carpet, or the like, put on the floor surface) and multiple users are present on the tactile-sense application device 10. In this case, each of the tactile-sense application modules 100 analyzes the sensor information from the sensor unit 130 to recognize the relative positional relationship (e.g., a separation distance) between the users and its own apparatus and generates the positional information. Furthermore, each of the tactile-sense application modules 100 may change the tactile control signal by using the positional information and the perceptual setting information. Thus, each of the tactile-sense application modules 100 may apply a tactile stimulus that dynamically changes in accordance with the positions of the users.

Furthermore, in the above description, each of the tactile-sense application modules 100 changes the tactile control signal in accordance with its positional information and perceptual setting information to apply an appropriate tactile stimulus even when the position of each of the tactile-sense application modules 100 is changed. However, this is not a limitation, and each of the tactile-sense application modules 100 may physically adjust the position of each of the tactile-sense application modules 100 instead of changing the tactile control signals (or together with changing the tactile control signal). For example, when the tactile-sense application module 100 analyzes the sensor information from the sensor unit 130 and thus recognizes a change in the position of its own apparatus, it may control the actuator, or the like, of the tactile-sense applying unit 140 to move its own apparatus to an appropriate position so as to eliminate a change in the position and apply an appropriate tactile stimulus.

Furthermore, the advantageous effect described in this description is merely for illustration or exemplification and not for limitation. That is, the technology according to the present disclosure may produce other advantageous effects apparent to those skilled in the art from this description in addition to or instead of the above-described advantageous effect.

Furthermore, the following configurations also belong to the technical scope of the present disclosure.

(1)

An information processing apparatus comprising:

an acquiring unit that acquires positional information on at least one of a plurality of tactile-sense applying units that apply a tactile stimulus by using a tactile control signal generated for each of the tactile-sense applying units; and a data processing unit that changes the tactile control signal by using the positional information.

(2)

The information processing apparatus according to (1), wherein the tactile-sense applying units are included in one or one group of tactile-sense application devices.

(3)

The information processing apparatus according to (2), wherein the data processing unit changes a tactile control signal used by the tactile-sense application device to generate a tactile control signal used by a different tactile-sense application device.

(4)

The information processing apparatus according to (3), wherein the data processing unit changes the tactile control signal in accordance with a difference in the positional information between the tactile-sense application device and the different tactile-sense application device.

(5)

The information processing apparatus according to (4), wherein the difference is caused due to a difference in an installation layout of the tactile-sense applying units between the tactile-sense application device and the different tactile-sense application device.

(6)

The information processing apparatus according to (4), wherein the difference is caused due to a difference in an attachment state or a usage mode of a user between the tactile-sense application device and the different tactile-sense application device.

(7)

The information processing apparatus according to any one of (2) to (6), wherein the information processing apparatus functions as the tactile-sense applying unit.

(8)

The information processing apparatus according to any one of (1) to (7), wherein the positional information is information indicating a relative positional relationship between the tactile-sense applying units or information indicating an absolute position of a target to which the tactile stimulus is applied.

(9)

The information processing apparatus according to any one of (1) to (8), further comprising a positional-information generating unit that generates the positional information based on predetermined sensor information.

(10)

The information processing apparatus according to any one of (1) to (9), wherein the tactile stimulus includes at least one of a vibration, a sense of force, and a temperature sense.

(11)

An information processing method implemented by a computer, comprising:

acquiring positional information on at least one of a plurality of tactile-sense applying units that apply a tactile stimulus by using a tactile control signal generated for each of the tactile-sense applying units; and changing the tactile control signal by using the positional information.

(12)

A program causing a computer to execute:

acquiring positional information on at least one of a plurality of tactile-sense applying units that apply a tactile stimulus by using a tactile control signal generated for each of the tactile-sense applying units; and changing the tactile control signal by using the positional information.

REFERENCE SIGNS LIST

10 TACTILE-SENSE APPLICATION DEVICE
100 TACTILE-SENSE APPLICATION MODULE
110 CONTROL UNIT
111 POSITIONAL-INFORMATION GENERATING UNIT
112 DATA PROCESSING UNIT
120 COMMUNICATION UNIT
130 SENSOR UNIT
140 TACTILE-SENSE APPLYING UNIT
150 STORAGE UNIT
200 SERVER
210 CONTROL UNIT
211 PERCEPTUAL-POSITION/INTENSITY DETERMINING UNIT
212 OUTPUT CONTROL UNIT
220 COMMUNICATION UNIT
230 OPERATION INPUT UNIT
240 DISPLAY UNIT
250 STORAGE UNIT

The invention claimed is:

1. An information processing apparatus comprising:
a tactile-sense applying unit configured to apply a tactile stimulus;

an acquiring unit configured to acquire positional information on at least one of a plurality of other tactile-sense applying units configured to apply the tactile stimulus by using a respective tactile control signal generated for each respective other tactile-sense applying unit of the plurality of other tactile-sense applying units;

a data processing unit configured to change at least one respective tactile control signal by using the positional information for at least one respective other tactile-sense applying unit and perceptual setting information; and a communication unit configured to transmit the at least one respective changed tactile control signal to the at least one respective other tactile-sense applying unit, wherein the perceptual setting information includes a movement route of a perceptual position of the tactile stimulus, wherein the tactile-sense applying unit, the acquiring unit, the data processing unit, and the communication unit are each implemented via at least one processor.

2. The information processing apparatus according to claim 1, wherein the plurality of other tactile-sense applying units are included in at least one group of tactile-sense application devices.

3. The information processing apparatus according to claim 2, wherein the data processing unit changes a first tactile control signal used by a first tactile-sense application device in a group of the at least one group of tactile-sense application devices to generate a second tactile control signal used by a second tactile-sense application in the group that is different from the first tactile-sense application device.

4. The information processing apparatus according to claim 3, wherein the data processing unit changes the tactile control signal in accordance with a difference in the positional information between the first tactile-sense application device and the second tactile-sense application device.

5. The information processing apparatus according to claim 4, wherein the difference is caused due to a difference in an installation layout of the tactile-sense applying units between the tactile-sense application device and the different tactile-sense application device.

6. The information processing apparatus according to claim 4, wherein the difference is caused due to a difference in an attachment state or a usage mode of a user between the tactile-sense application device and the different tactile-sense application device.

7. The information processing apparatus according to claim 1, wherein the positional information is information indicating a relative positional relationship between the tactile-sense applying units or information indicating an absolute position of a target to which the tactile stimulus is applied.

8. The information processing apparatus according to claim 1, further comprising a positional-information generating unit that generates the positional information based on predetermined sensor information.

9. The information processing apparatus according to claim 1, wherein the tactile stimulus includes at least one of a vibration, a sense of force, and a temperature sense.

10. The information processing apparatus according to claim 1, wherein the data processing unit changes output intensity of the respective tactile control signal for the at least one respective other tactile control signal.

11. An information processing method implemented by a computer, comprising:
applying a tactile stimulus using a tactile-sense applying unit;
acquiring positional information on at least one of a plurality of other tactile-sense applying units configured to apply the tactile stimulus by using a respective tactile control signal generated for each respective other tactile-sense applying unit of the plurality of other tactile-sense applying units;
changing at least one respective the tactile control signal by using the positional information for at least one respective other tactile-sense applying unit and perceptual setting information; and
transmitting the at least one respective changed tactile control signal from the tactile-sense applying unit to the at least one respective other tactile-sense applying unit,
wherein the perceptual setting information includes a movement route of a perceptual position of the tactile stimulus.

12. A non-transitory computer-readable storage medium having embodied thereon a program, which when executed by a computer causes the computer to execute a method, the method comprising:
applying a tactile stimulus using a tactile-sense applying unit;
acquiring positional information on at least one of a plurality of other tactile-sense applying units configured to apply the tactile stimulus by using a respective tactile control signal generated for each respective other tactile-sense applying unit of the plurality of other tactile-sense applying units;
changing at least one respective the tactile control signal by using the positional information for at least one respective other tactile-sense applying unit and perceptual setting information; and
transmitting the at least one respective changed tactile control signal from the tactile-sense applying unit to the at least one respective other tactile-sense applying unit,
wherein the perceptual setting information includes a movement route of a perceptual position of the tactile stimulus.

* * * * *